United States Patent
Spiridellis

(10) Patent No.: US 7,983,398 B2
(45) Date of Patent: Jul. 19, 2011

(54) EMERGENCY CONTACT SYSTEM

(75) Inventor: Nikolaos T. Spiridellis, Clearwater, FL (US)

(73) Assignee: First Call Solutions, Inc., Clearwater, FL (US)

( * ) Notice: Subject to any disclaimer, the term of this patent is extended or adjusted under 35 U.S.C. 154(b) by 1781 days.

(21) Appl. No.: 10/429,632

(22) Filed: May 5, 2003

(65) Prior Publication Data

US 2004/0223598 A1    Nov. 11, 2004

(51) Int. Cl.
  *H04M 11/00* (2006.01)
(52) U.S. Cl. ............... 379/88.11; 379/88.13; 379/88.23; 379/88.25; 379/88.26; 379/202.01; 379/204.01; 379/205.01
(58) Field of Classification Search ............... 379/88.11, 379/88.13, 88.23, 88.25, 88.26, 202.01, 204.01, 379/205.01
  See application file for complete search history.

(56) References Cited

U.S. PATENT DOCUMENTS

| | | | |
|---|---|---|---|
| 4,920,556 A * | 4/1990 | Wong | 379/51 |
| 5,559,867 A | 9/1996 | Langsenkamp et al. | 379/69 |
| 5,912,947 A | 6/1999 | Langsenkamp et al. | 379/69 |
| 5,987,331 A * | 11/1999 | Grube et al. | 455/509 |
| 6,018,668 A * | 1/2000 | Schmidt | 455/518 |
| 6,148,068 A * | 11/2000 | Lowery et al. | 379/202.01 |
| 6,272,214 B1 * | 8/2001 | Jonsson | 379/202.01 |
| 6,556,664 B1 * | 4/2003 | Langsenkamp | 379/69 |
| 6,885,874 B2 * | 4/2005 | Grube et al. | 455/520 |
| 6,993,355 B1 * | 1/2006 | Pershan | 455/518 |
| 2003/0108166 A1 * | 6/2003 | Coppinger et al. | 379/88.11 |

OTHER PUBLICATIONS

Press Release, "Contact 911.com Your Online Emergency Contact List," PRWeb, Sep. 11, 1999, pp. 1-4.
Article, "REVERSE 911," Sigma Communications, Inc., pp. 1-8, (Copyright date 2000 (as appears on web page)).
Nitsuko, NVM-2e, Installation Instructions and Release Notes for Versions 1.08, 1.08.02, and 1.20, Part No. 17780INS06, Issue 1-0, Jun. 2000.

* cited by examiner

*Primary Examiner* — Quynh H Nguyen
(74) *Attorney, Agent, or Firm* — Trop, Pruner & Hu, P.C.

(57) ABSTRACT

A technique includes receiving a first communication from a first member of a group of members and recording a voice message during the communication from the first member. The technique includes, in response to the first communication, automatically attempting to communicate with at least one member of the group other than the first member to deliver the recorded voice message.

19 Claims, 10 Drawing Sheets

EMERGENCY CONTACT SYSTEM

BACKGROUND

The invention generally relates to an emergency contact system.

The occurrence of a catastrophic event, such as a natural disaster or an event that is attributable to terrorism, typically results in an increased use of local telephone exchanges near the location of the event. In this manner, many people typically rely on a land line-based or cellular telephone system for purposes of verifying the welfare of friends and family members that live or work near the location of the catastrophic event.

Unfortunately, the local telephone exchanges may become overloaded soon after the event occurs so that people cannot rely on the telephone system to check on friends and family members living in the area that is affected by the catastrophic event, as some telephone numbers may be inaccessible.

Thus, it may be desirable for friends and family members to keep alternative telephone numbers for each other for use in times of a catastrophic event. As example, these alternative telephone numbers may be land line-based telephone numbers, cellular telephone numbers, etc. However, keeping track of these alternative telephone numbers for use during a catastrophic event or other emergency is a laborious task, as the numbers frequently change due to changes in residence addresses, changes in cellular providers, etc. Furthermore, alternative contact numbers (a telephone number of a neighbor or the telephone number of a hospital, as examples) may emerge shortly after the emergency/catastrophic event. Therefore, someone may be reachable at a telephone number that was not originally listed with the set of emergency contact numbers for that person.

Thus, there is a continuing need for a technique and/or a system to accommodate one or more of the problems that are stated above as well as possibly address problems that are not stated above.

DETAILED DESCRIPTION

In accordance with an embodiment of the invention, a contact coordination facility (an 800 toll-free number, for example) stores contact information for each member (a family member or a friend, for example) of a particular group to use in times of a catastrophic event or other emergency.

As described below, this contact coordination facility (called an "emergency contact system" herein), in some embodiments of the invention, bypasses local land-line telephone exchange (s) and also receives message(s) for distribution by any available communication capability (a land line-based telephone, a wireless telephone, email communication, wireless text messaging, etc.). In accordance with some embodiments of the invention, this emergency contact system intuitively attempts to deliver the message to all group members simultaneously by utilizing stored (multiple phone numbers and email for each family or group member) and update contact information (temporary "best number" provided by group members) for each family (group) member, using long distance circuit as well as emailing the voice message file. When contact is made with each family (group) member, the emergency contact system stores contact numbers (or any other contact address) as the "best number" for further use. Additionally, as described herein, the emergency contact system may provide call bridging between group members for telephone conversations using long distance circuits, thereby bypassing any local exchange(s).

Figure 1:
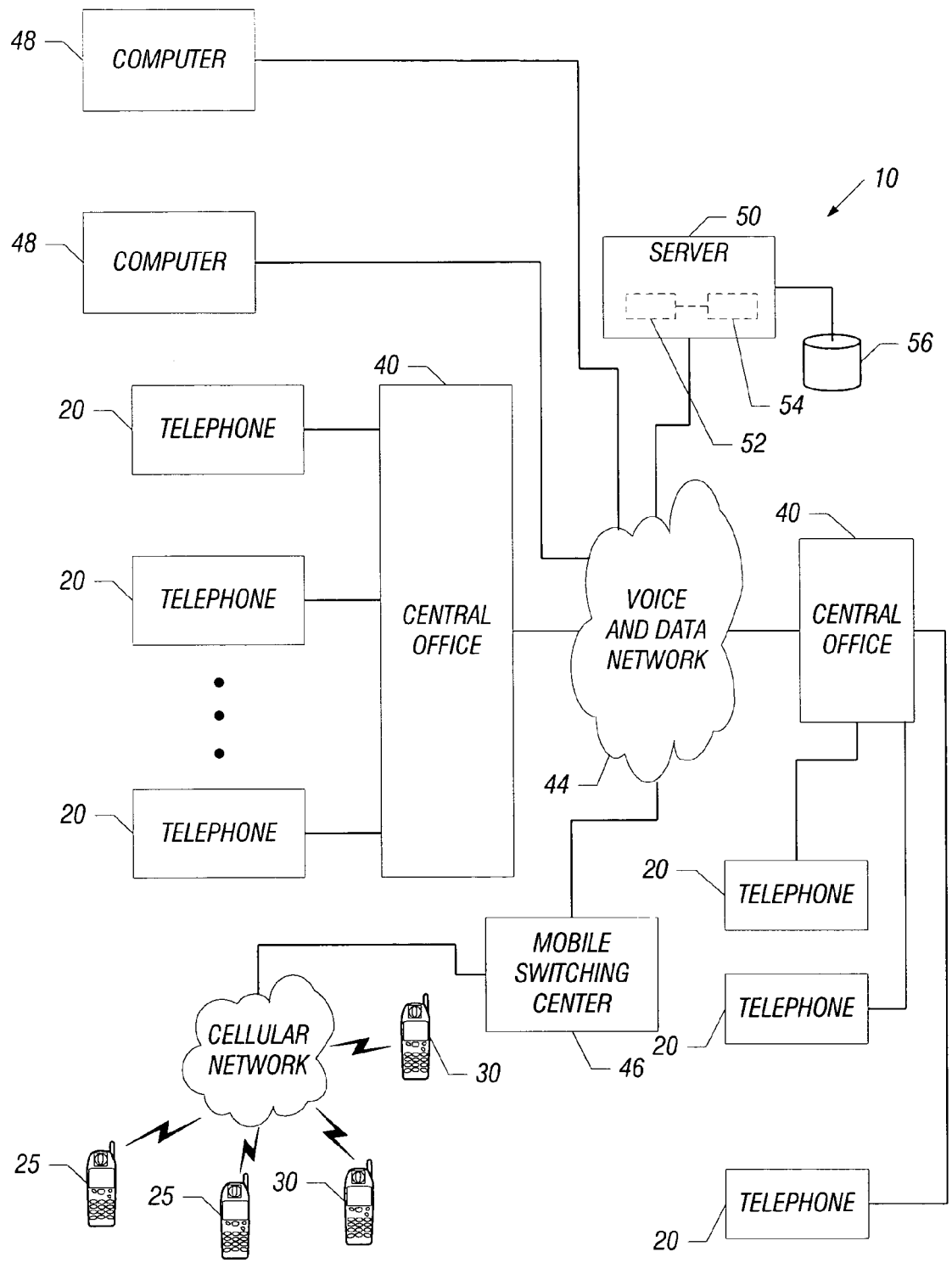
FIG. 1 is a schematic diagram of a communication system according to an embodiment of the invention.

As an example, the emergency contact system may be part of a voice and data communication system, such as an exemplary voice and data communication system 10 that is depicted in FIG. 1. More specifically, the system 10 may be used to establish communication between a variety of different communication devices that rely on a voice and data network 44 of the system 10. These communication devices may include, as examples, such communication devices as land line-based telephones 20 (analog telephones, digital telephones, cordless telephones, etc.) and wireless communication devices, such as cellular telephones 25 and wireless personal digital assistants (PDAs) 30. A computer 48 may also be considered a communication device in that the computer 48 may use the network 44 for purposes of exchanging data, electronic mail ("email"), sound files and possible voice stream communications with another communication device that is coupled to the network 44.

Thus, the system 10 may be used for purposes of communicating, land line-based telephone calls, cellular telephone calls, text messages (to wireless devices, for example), voice messages, e-mail communications, Internet traffic, etc.

Among its other features, the network 44 (of the system 10) forms a long distance interexchange (IXC) (i.e., a long distance backbone) that includes equipment and switches of various long distance carriers. The IXC typically is more reliable than local telephone exchanges that are established by central offices 40 that, in turn, connect the land-based telephones 20 to the network 44. This is especially true during periods of high usage for the local telephone exchanges, such as the high usage that occurs when a particular central office 40 is near the site of a catastrophic event, such as a natural disaster or an event that is attributable to terrorism.

Thus, in the case of a catastrophic event, it may be difficult for members of a family or other group to contact each other, as local telephone calls may be precluded due to under-capacity or outage of the local telephone exchanges. Furthermore, it is possible that communication via cellular telephones 25, personal digital assistants 30 and the computers 48 may be impaired to a certain extent. Additionally, assuming that it is possible to reach a particular person (affected by the catastrophic event) at one or more telephone numbers, the person may not be in the vicinity of the communication device(s) that are associated with these contact telephone numbers. For example, the person may have lost or otherwise be displaced from his/her cellular telephone and may be at a location (at the hospital or at a neighbor's house) away from a land line based telephone(s) associated with a particular emergency contact number(s).

Thus, in times of a catastrophic event or other emergency, it is desirable to have a single contact address, outside of the local communications network (in some embodiments of the invention), at which all members of a particular group of family members, group of friends or other group may use to establish communication with other members of the group. In the context of this application, the language "contact address" means a communication address for a person, such as a land line-based telephone number, a cellular telephone number, an email address, etc.

For purposes of facilitating the communication between members of a group during a particular emergency (whether specific to the group or attributable to a catastrophic event), the system 10 includes a server 50 that establishes an emergency contact system. More specifically, in some embodiments of the invention, the server 50 is connected to the network 44 for purposes of establishing an emergency contact address that may be used for purposes of establishing communication between members of various groups.

In some embodiments of the invention, the emergency contact address is a toll-free telephone number (an "800 number," for example) that provides access to the emergency contact system, as described further below. For purposes of simplifying the description of this emergency contact system, it is assumed below that the emergency contact address for the emergency contact system is a telephone number. However, it is understood that in other embodiments of the invention, this emergency contact address may be another communication contact address, such as an Internet web site address, an email address, etc.

In some embodiments of the invention, the server 50 includes a processor (a microprocessor, for example) 52, as well as a memory 54 for purposes of storing various software routines or programs to perform various functions (described herein) to establish and maintain the emergency contact system. Furthermore, subscriber information, program code, etc. may be stored on a database 56 that is coupled to the server 50. Although the server 50 is depicted in FIG. 1 as being directly connected to the network 44, it is understood, the server 50 may be connected to the network 44 in a variety of different arrangements, each of which forms an embodiment of the invention. In some embodiments of the invention, the server 50 is connected to the IXC long distance backbone. Therefore, access to the server 50 may not be impaired even if some local telephone exchanges become overburdened or unavailable.

In operation, in some embodiments of the invention, the emergency contact system is a subscriber-based system in which each member of a particular group (a group of family members, a group or friends, a group of co-workers, etc.) of people may register contact information for that member. As described below, using the registered contact information for a particular group, the emergency contact system may be used to automatically communicate with the members of the group when the system is prompted to do so by one of the group's members.

Depending on the particular embodiment of the invention, the emergency contact system may contact the members of the group using several different techniques. For example, in some embodiments of the invention, this communication may be a voice communication to a cellular telephone or land line-based telephone, may be a text communication to a PDA or a computer, may involve voice-to-text translation to convert a voice message into a resultant text message, etc. Furthermore, in some embodiments of the invention, the emergency contact system may use different types of communications to the same group member. For example, in some embodiments of the invention, the emergency contact system may simultaneously or near simultaneously schedule an email and a telephone call to each group member. Many other variations are possible.

As a more specific example, a particular family (i.e., a group) may subscribe to the emergency contact system. Thus, each family member registers contact information for that family member. It is noted that the contact information for a particular family member may be updated by calling the emergency contact telephone number. Therefore, when particular email address or telephone number (as examples) of a family member changes, the family member may call the emergency contact telephone number to update his or her associated contact information. The ability to update the information is particularly useful in the case of a particular emergency in that a particular family member may be reachable at a new, unforeseen contact address (a neighbor's telephone number or a number at a hospital, for example) after the occurrence of the catastrophic event.

Thus, pursuant to its role of establishing the emergency contact system, the server 50 stores and maintains contact information for subscribers that are affiliated with different groups.

In some embodiments of the invention, the emergency contact system (i.e., the server 50 in some embodiments of the invention) automatically contacts the members of a particular group to deliver a message that was posted, or recorded, by one of the group's members. For example, one of the members of a particular group may call the emergency telephone number to record a voice message. In response to this call, the server 50 initiates calls to the other members of the group to deliver the recorded voice message using the contact addresses that have been registered for these members. If the server 50 fails to contact a particular member at a particular contact address, the server 50 uses another contact address for the member and alternatively repeatedly attempts to contact the affected member(s) at one or more of its contact addresses until the member is contacted. In some embodiments of the invention, the server 50 may, when prompted by a particular member of a group, contact the other members with a new telephone number that is posted by the member. It is noted that when the server 50 contacts a particular member, the member may update the contact information that is registered for that member.

Figure 2:
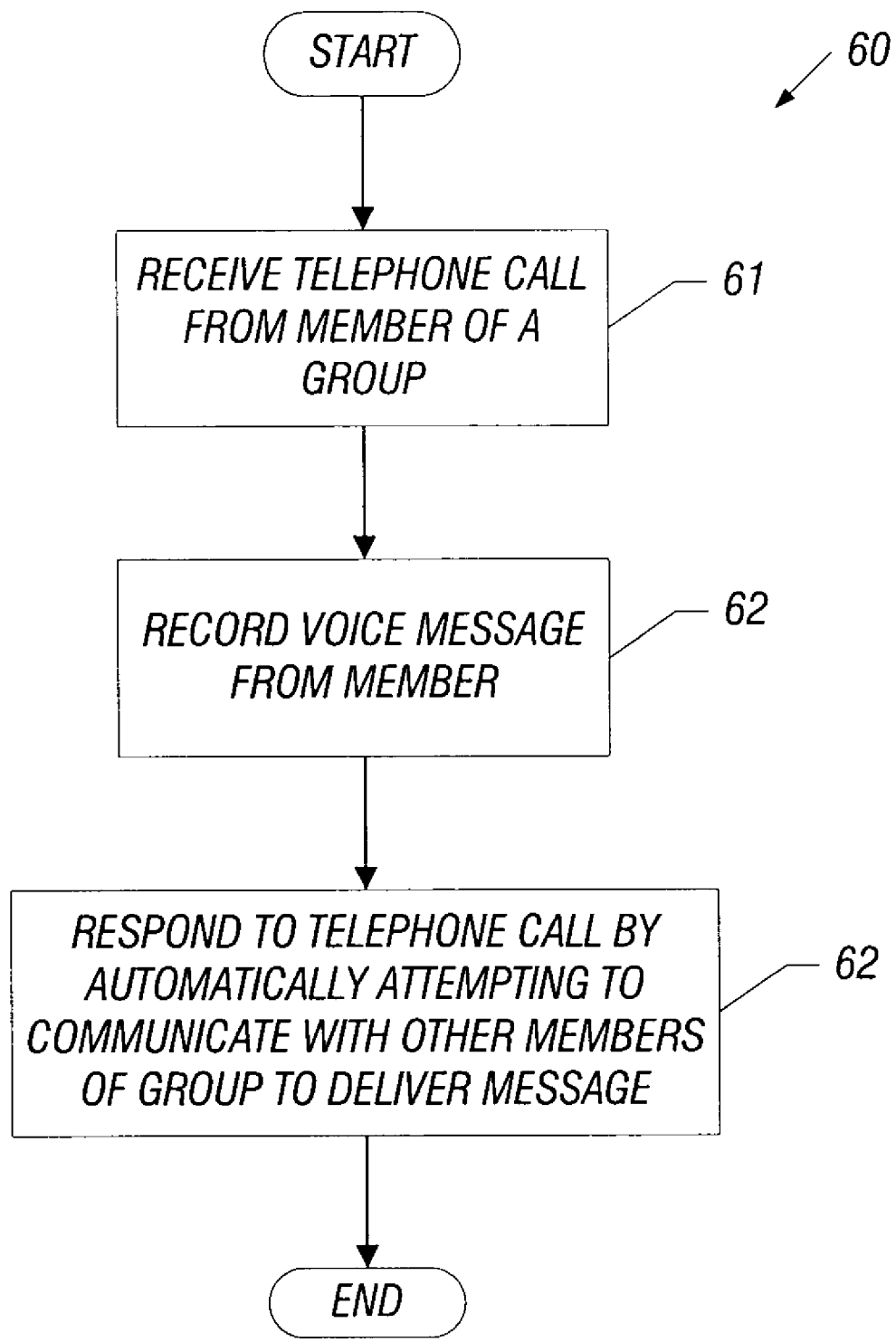
FIG. 2 is a flow diagram depicting a technique used by a server of the network of FIG. 1 according to an embodiment of the invention.

Referring to FIG. 2, thus, a technique 60 in accordance with an embodiment of the invention includes receiving (block 61) a communication, such as a telephone call, from a member of a particular group. In response to this communication, the technique 60 includes recording a voice message from the calling member, as depicted in block 62. The technique 60 also includes responding to the communication from the member by automatically attempting to communicate with the other members of the group to deliver the recorded message, as indicated in block 64.

Figure 3:
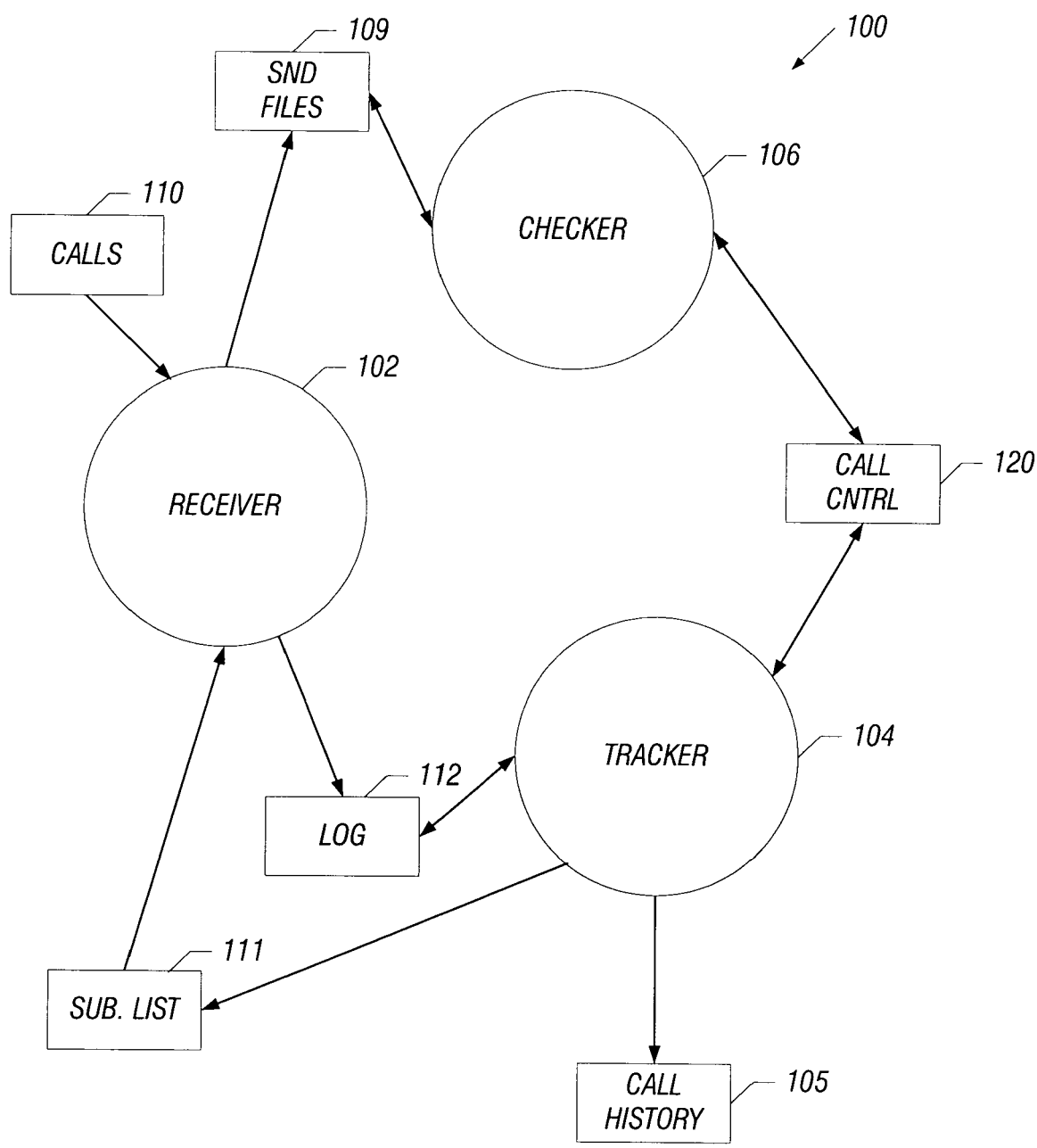
FIG. 3 is an illustration of a software architecture in accordance with an embodiment of the invention.

In some embodiments of the invention, the server 50 may execute (i.e., the processor 52 (FIG. 1) may execute instructions that are stored in a memory 54 (FIG. 1) software instructions to establish a software architecture 100 that is depicted in FIG. 3. This architecture 100 includes a receiver 102 that responds to telephone calls 110 to the emergency telephone contact number. More particularly, when someone places a telephone call to the emergency contact number, the receiver 102, in accordance with some embodiments of the invention, checks a log-in password (supplied by the caller) and a subscriber identification (also supplied by the caller) with entries of a subscription list 111 for purposes of identifying the caller (and thus, identifying the caller's group) and verifying the caller's subscription.

Figure 5:
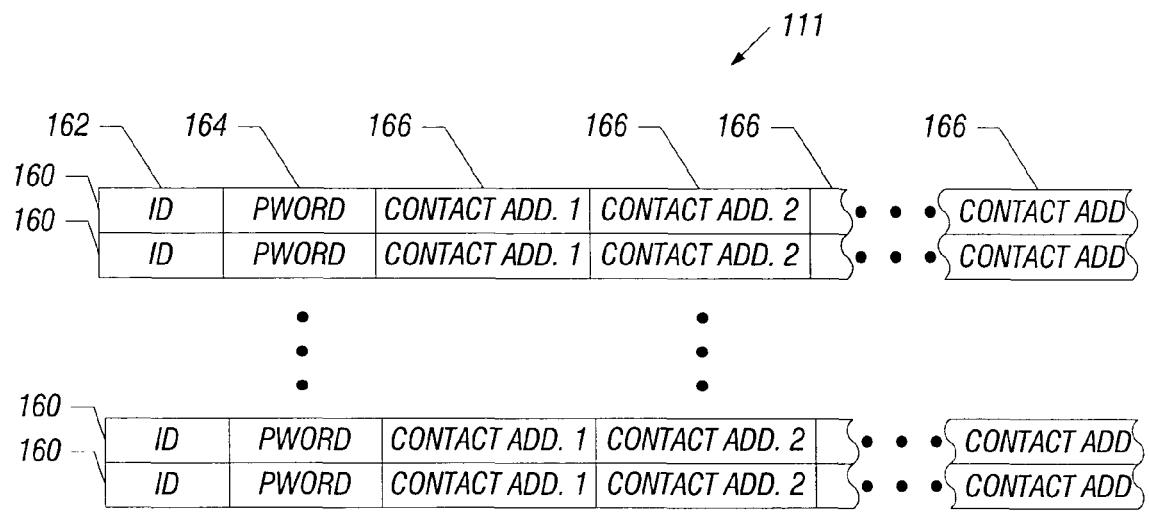
FIG. 5 is an illustration of a subscription list used by the architecture of FIG. 3 according to an embodiment of the invention.

As a more specific example, FIG. 5 depicts an exemplary subscription list 111. As shown, this list 111 includes various records 160, each of which is associated with a particular subscriber. In this manner, as an example, each record 160 may include an identification field 162 that uniquely identifies a particular subscriber and a field 164 that identifies the password of the subscriber. In some embodiments of the invention, the receiver 102 associates each subscriber with a particular group. The group affiliation may be indicated, for example, by a segment of the subscriber's identification (in the field 162).

As depicted in FIG. 5, each record 160 may also include various fields 166 that are each associated with the contact information for the subscriber. For example, one of these fields 166 may identify a first land line-based telephone number, another one of these fields 166 may identify a second land line-based telephone number, another one of these fields 166 may identify a mobile telephone number, another one of these fields may identify an email address, etc.

Figure 4:
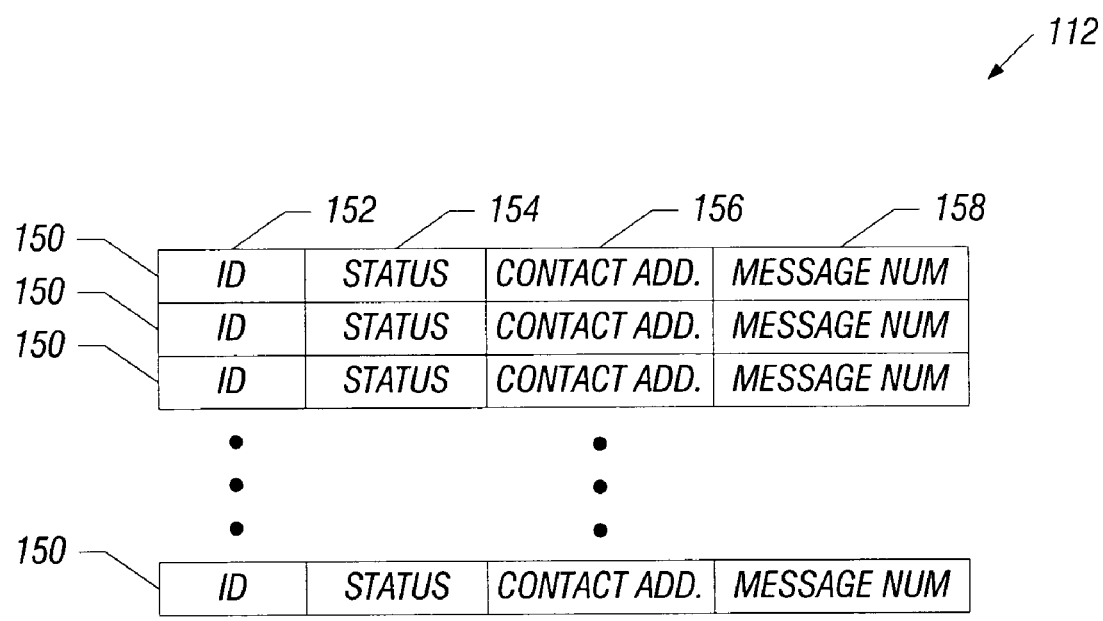
FIG. 4 is an illustration of a call log used by the architecture of FIG. 3 according to an embodiment of the invention.

Referring to FIG. 3, upon identifying a particular caller, the receiver 102 creates a record in a call log 112. Each record in the call log 112 is associated with a particular call and identifies any updates due changes to occur as a result of that call. FIG. 4 depicts an exemplary call log 112, and as shown in FIG. 4, this call log 112 includes various records 150. Each record 150, in turn, is associated with a particular call.

For a given telephone call, the caller (assuming the caller is a recognized subscriber) may change a contact address, such as a telephone number or an email address, for example. The caller may also record a voice message that is stored by the receiver 102 as a sound file 109 (FIG. 3).

As shown by way of example in FIG. 4, in some embodiments of the invention, each record 150 includes an identification field 152 that identifies the particular caller and a status field 154 that identifies whether a message was left by the caller and/or whether the caller left a message. If a message was left, then a particular field 158 of the record 150 identifies a message number. This message number, in turn, uniquely addresses a particular sound file 109 (FIG. 3) that represents a message that was recorded by the receiver 102 during the call. Additionally, each record 150 may include, for example, a field 156 that stores a new contact address (a telephone number or email address, as examples) that was posted. The fields of each record 150 may also identify previously stored contact numbers that are to be removed and additional new contact addresses, depending on the particular embodiment of the invention. Other variations are possible, and thus, other and different information may be stored in each record 150, depending on the particular embodiment of the invention.

Thus, in some embodiments of the invention, the receiver 102 of FIG. 3 receives telephone calls 110; verifies identifications and passwords via a subscription list 111; and creates a calls log 112 that details information (a voice message or new contact address, for example) that was posted during telephone calls from subscribers.

In some embodiments of the invention, the architecture 100 of FIG. 3 also includes a tracker 104 to process information from the received calls and schedule outgoing calls. More specifically, the tracker 104 processes each record of the call log 112. The tracker 104 then uses the information gathered from the call log 112 to generate a call control list 120, a list 120 that, as its name implies, controls outgoing calls.

Figure 6:
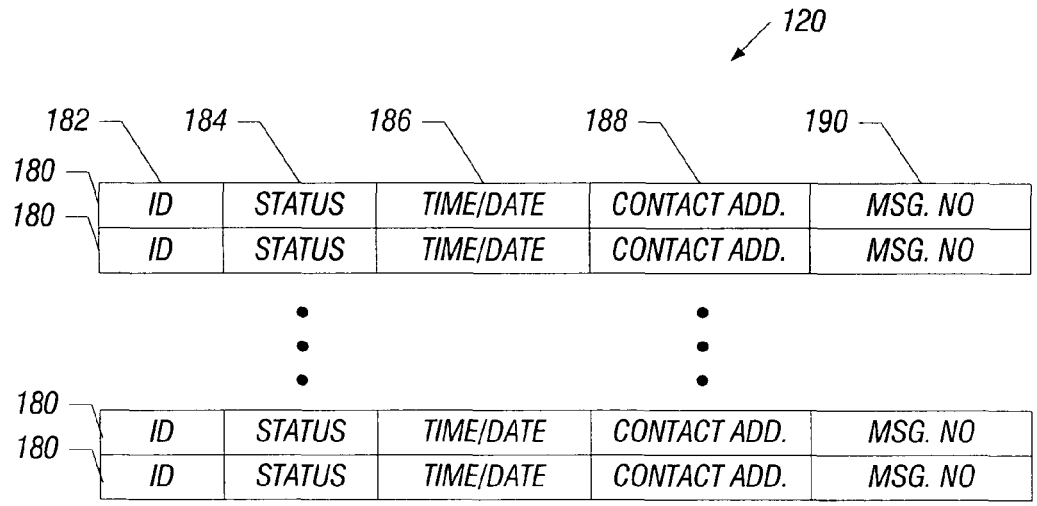
FIG. 6 is an illustration of a call control list used by the architecture of FIG. 3 according to an embodiment of the invention.

An exemplary call control list 120 is depicted in FIG. 6. As shown, the call control list 120 includes various records 180, each of which is associated with an outgoing call to be placed, an outgoing call that is being placed, or an outgoing call that was placed. Thus, by leaving a voice message, a particular caller may cause the tracker 104 to generate several records 180, each of which is associated with a different outgoing call. As an example, a particular record 180 may include an identification field 182 that identifies a particular outgoing call, a field 184 that identifies a status of the outgoing call and a field 186 that identifies a time and/or date on which an outgoing call is to be made.

As a more specific example, in some embodiments of the invention, the status field 184 indicates whether a particular call is in progress, indicates whether a particular call is finished, indicates whether a particular call is being processed by the tracker 104, indicates whether a particular call is ready for an outgoing call and indicates whether a data/time of the next caller has been set. In some embodiments of the invention, the status field 184 may also include an idle state for the particular record. In some embodiments of the invention, each record 180 may also include a field 188 indicating the contact address (a telephone number, email address, etc.) to be used in the outgoing communication. It is noted that in some embodiments of the invention, a particular record 180 may be created for each particular contact number to which communication is to be established.

In some embodiments of the invention, each record 180 may include a field 190 to identify a particular message number that is associated with an outgoing communication.

In this manner, this message number uniquely identifies a sound file 109 (FIG. 3) that represents an audio to be delivered in the outgoing communication. It is noted that the message file may be broadcast by audio if the outgoing communication involves a telephone call and may be attached as a sound file (a file having a ".WAV" extension, for example) if the outgoing communication involves an email transmission.

Among its other outputs, in some embodiments of the invention, the tracker 104 may generate a file 105 that indicates a call history. Each record in this call history, in turn, indicates the status of a particular outgoing call. This call history, in some embodiments of the invention, may be searched by caller to retrieve information identifying which members of a particular group have been successfully contacted. Alternatively, in some embodiments of the invention, the tracker 104 may communicate (via email, for example) the call history for a particular member group to a caller. Other variations are possible.

Thus, to summarize, the tracker 104 processes a call log 112 that indicates details from calls to the emergency contact system. The tracker 104 uses the information gathered from the call log 112 to generate the call control list 120 that schedules the outgoing communications.

In some embodiments of the invention, the software architecture 100 includes a checker 106 (FIG. 3), a component of the architecture 100 that places the various outgoing communications, whether by telephone, email, etc. More specifically, in some embodiments of the invention, the checker 106 processes the call control list 120 and initiates outgoing communications at the scheduled times that are indicated by the records of the call control list 120. As depicted in FIG. 3, the checker 106 also accesses the sound files 109 for purposes of either replaying the voice message in an outgoing communication or attaching the voice message in a digital file to the outgoing communication.

Figure 7:
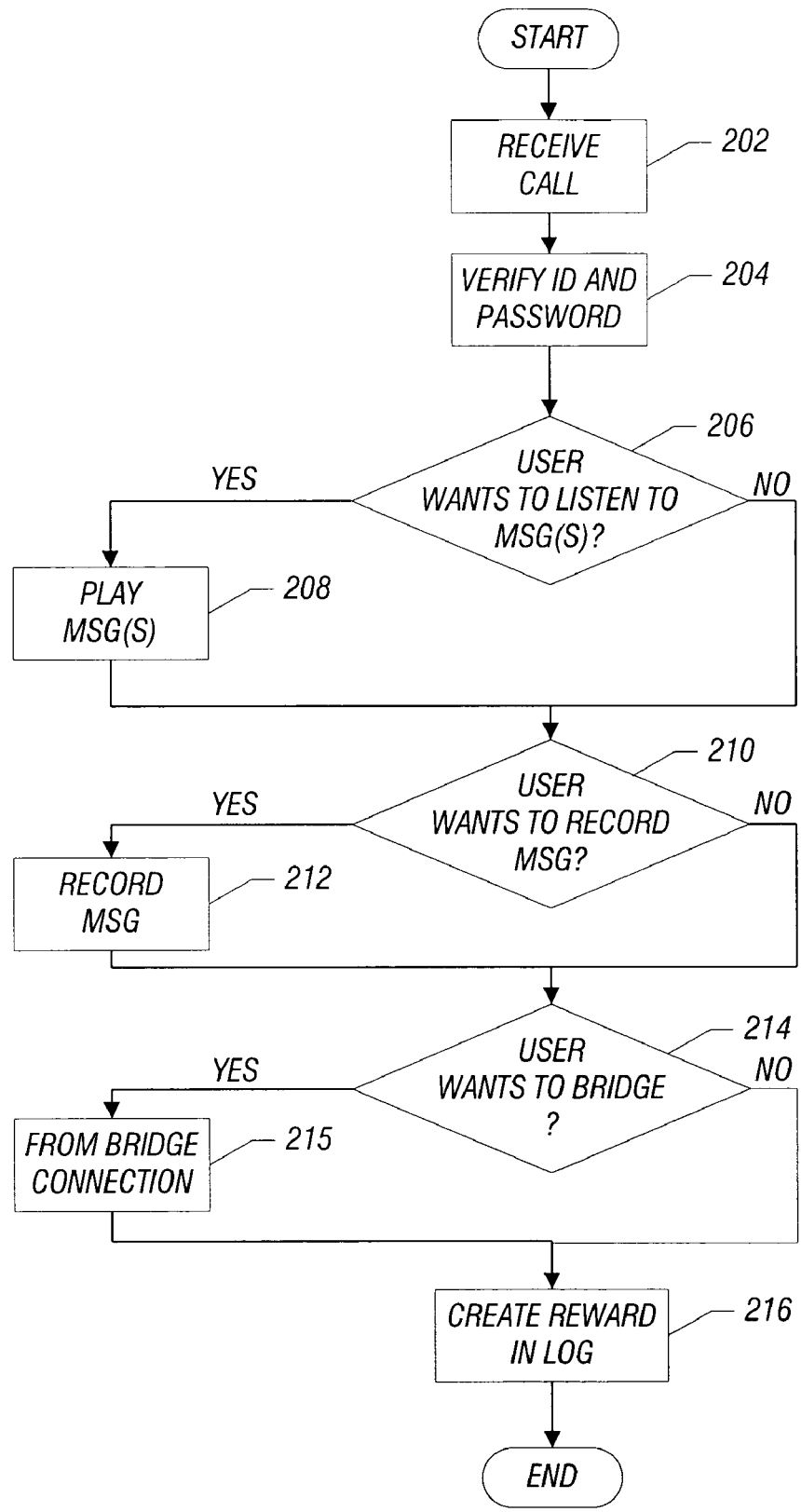
FIG. 7 is a flow diagram depicting a technique used by the architecture of FIG. 3 to receive calls according to an embodiment of the invention.

As a more specific example of the software architecture 100, FIG. 7 depicts a flow diagram used by the receiver 102 of the architecture 100, in accordance with some embodiments of the invention. In this technique 200, the receiver 102 receives (block 202) a telephone call and verifies the identification and password of the caller, as depicted in block 204. The receiver 102 then prompts the caller with various options including an option to determine (diamond 206) whether the user wants to listen to any recorded messages posted by members of the group. If so, the receiver 102 plays the messages, as depicted in block 208. The receiver 102 then prompts the user to indicate whether the user wants to record any messages, as depicted in diamond 210. If so, then the user records (block 212) these messages.

Next, the receiver 102 determines (diamond 214) whether the user wants to establish a bridge connection to another member of the group. More specifically, in some embodiments of the invention, the emergency contact system may be used to automatically connect members of the group by forming a bridge connection between the calling party and another member of the group. This may be advantageous if the member is returning a communication from another member of the group, because the first communication is known to have occurred from an operable connection.

If the user wants to establish a bridge connection, then the receiver 102 forms the bridge connection, as depicted in block 215. In some embodiments of the invention, the receiver 102 forms the bridge using long-distance circuits; and in some embodiments of the invention, the receiver 102 uses the "best number," to form this bridge connection. The "best number" may be established via a priority hierarchy that is established by each member of the group. In this regard, each member of the group may assign a priority number to each contact number for that member. Thus, a particular contact number may have the highest priority, or the designated "best number." Alternatively, the receiver 102 may determine the "best number." For example, the receiver 102 may assign the priority to particular set of contact numbers for the member based on the most recently received calls or other communications from that member.

After forming the bridge connection (if any), the receiver 102, in accordance with the technique 200, creates a record in the call log 112, as depicted in block 216.

Figure 8:
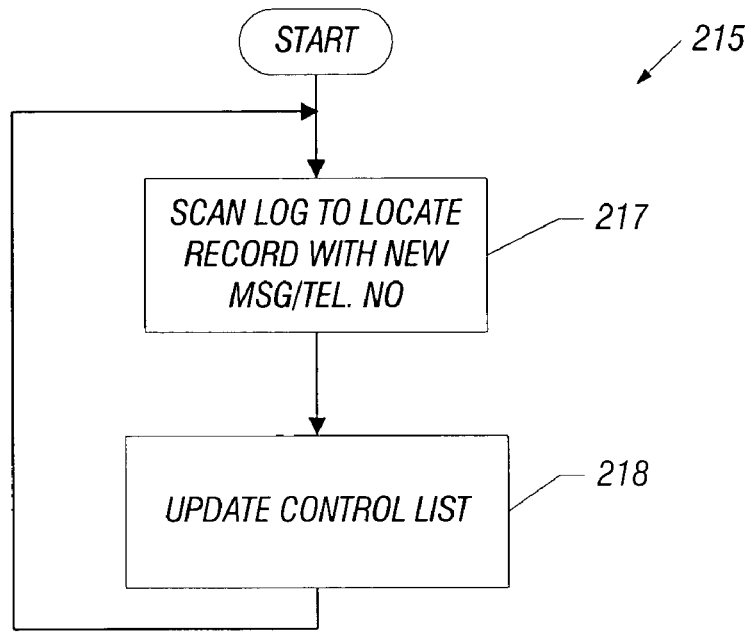
FIG. 8 is a flow diagram depicting a technique used by the architecture of FIG. 3 to update a call control list according to an embodiment of the invention.

In some embodiments of the invention, the tracker 104 may perform various functions, one of which is depicted by a technique 215 that is depicted in FIG. 8. In this manner, in the technique 215, the tracker 104 scans the call log to locate a record with a new message or telephone number (or other contact address), as depicted in block 217. Next, the tracker 104 updates (block 244) the control list with the new message number or telephone number (or other contact address). This update also includes setting the time and date for the corresponding outgoing calls.

It is noted that in some embodiments of the invention, the tracker 104 may schedule a combination of calls, emails, text messages, etc. to each member of the group (other than the calling member) to deliver the message. Thus, for example, a particular member of the group may receive, for example, an email, a PDA text message and a telephone call from the emergency contact system.

Figure 9:
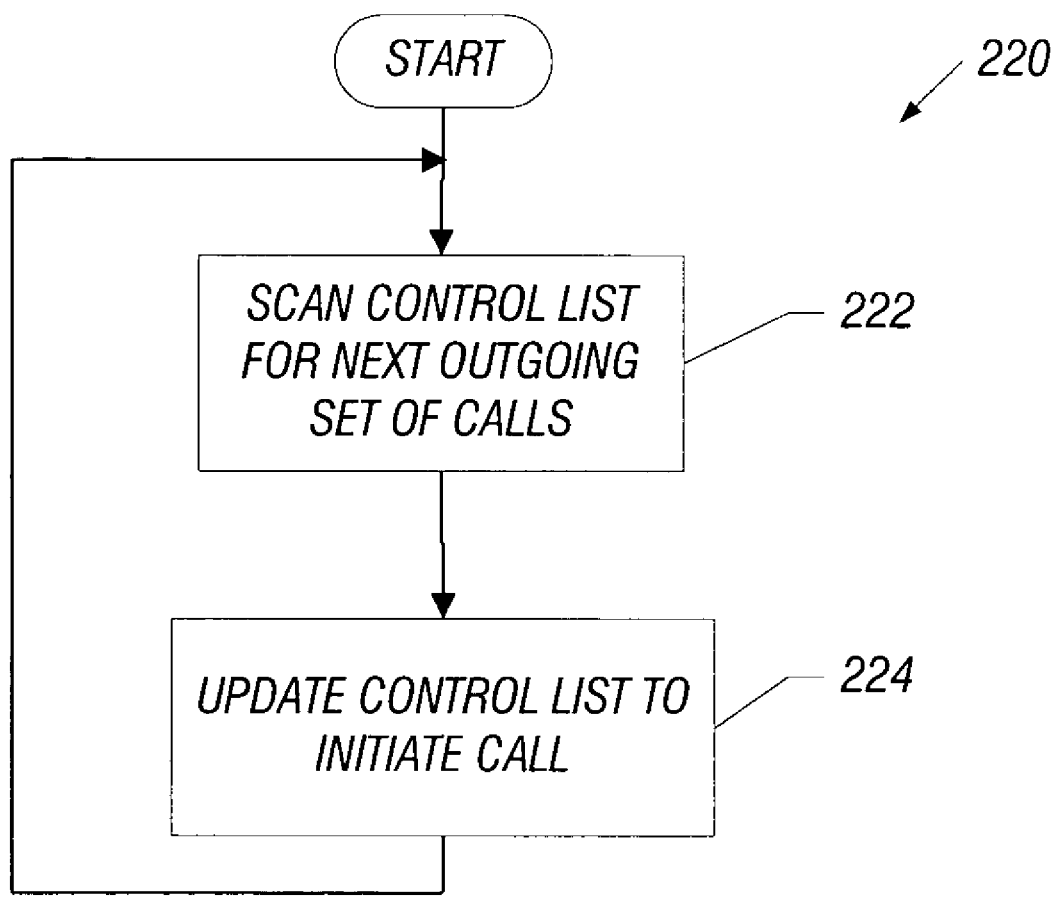
FIG. 9 is a flow diagram of a technique used by the architecture of FIG. 3 to initiate outgoing calls according to an embodiment of the invention.

Another technique 220 that is performed by the tracker 104 is depicted in FIG. 9. In this manner, pursuant to the technique 220, the tracker 104 scans the call control list 120 for the next set of outgoing calls, as depicted in block 222. Next, the tracker 104 updates (block 224) the control list 120 to initiate a particular call. More specifically, in the scanning of the control list, the tracker 104 determines a whether a particular record has a call time that close to the current time. For example, the tracker 104 may determine whether a particular record has a call time that is behind the current time. If the tracker 104 determines that an outgoing call is to be initiated, the tracker 104 updates the status information of the corresponding record of the control list to initiate an outgoing call by the checker 106.

Figure 10:
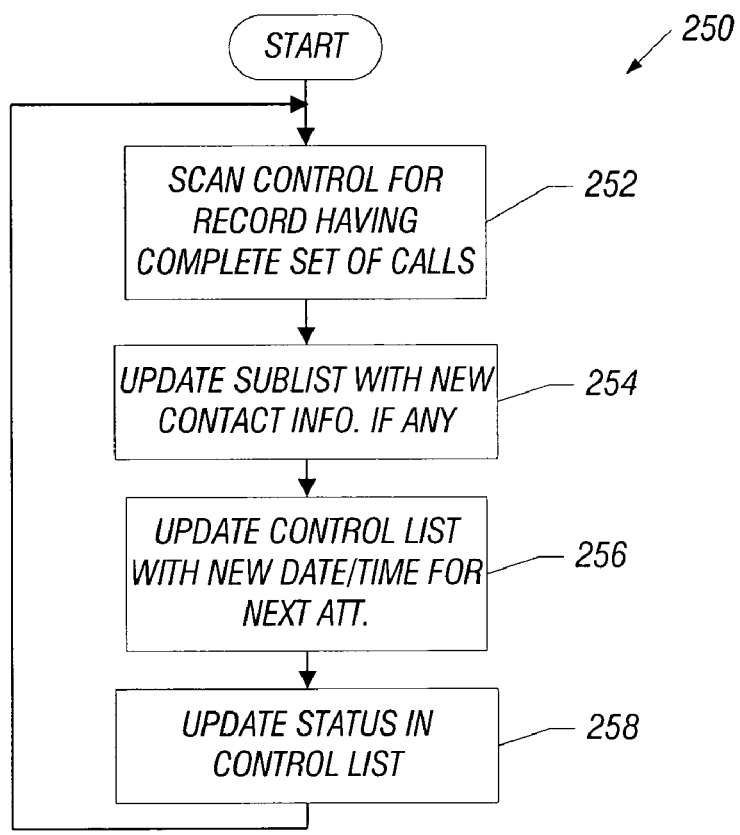
FIG. 10 is a flow diagram depicting a technique used by the architecture of FIG. 3 to update a control list and a subscription list according to an embodiment of the invention.

FIG. 10 illustrates another function that is performed by the tracker 104. This function is performed in accordance with a technique 250. In the technique 250, the tracker 104 scans (block 252) the control list for a record having a completed set of calls. The tracker 104 then updates (block 254) the subscription list with new contact information (if any). Subsequently, the tracker 104 updates (block 256) the control list with new dates/time information for the next attempted outgoing call(s). Lastly, pursuant to the technique 250, the tracker 104 updates (block 258) the corresponding status records in the control list.

Figure 11:
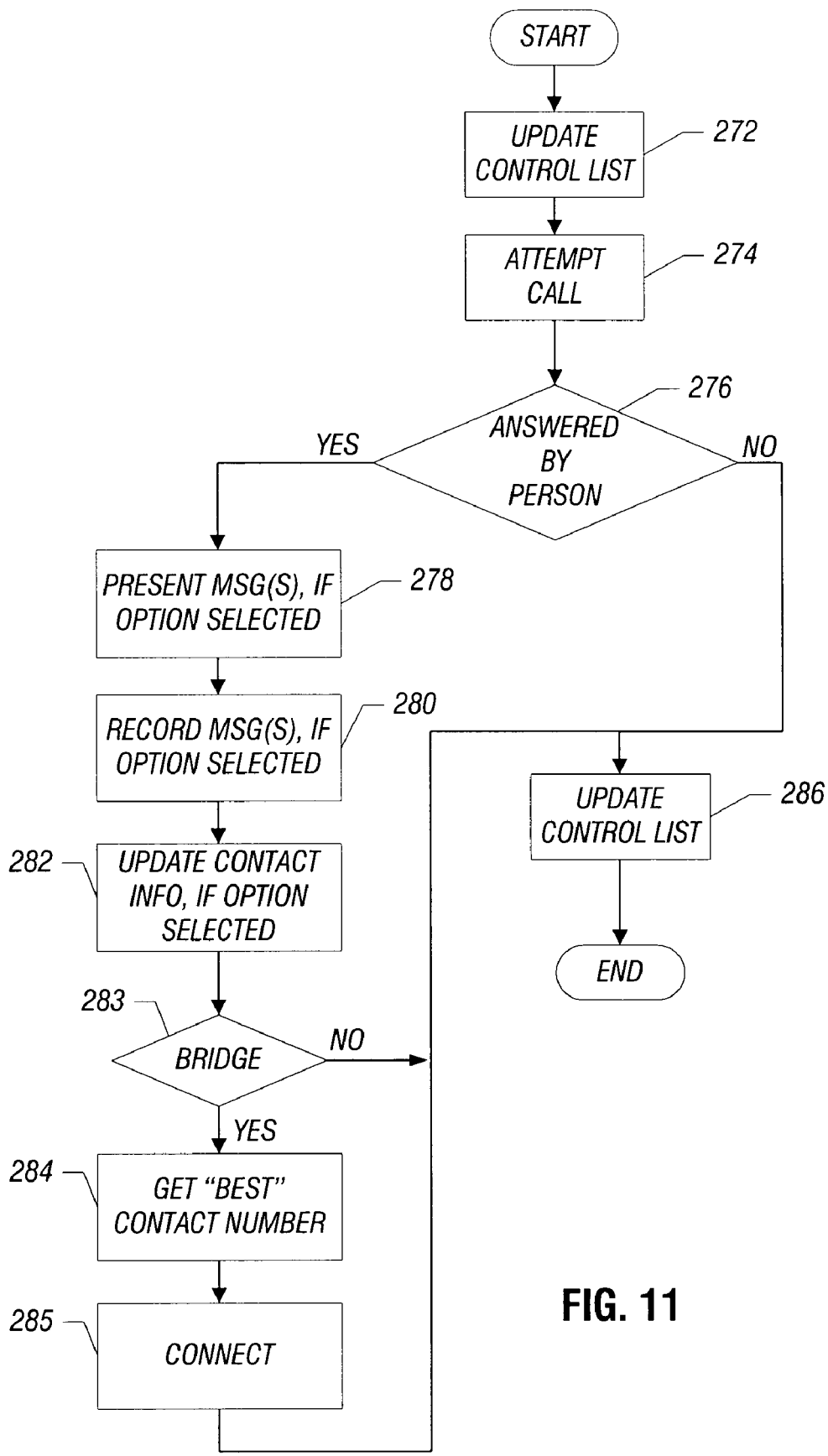
FIG. 11 is a flow diagram depicting a technique used by the architecture of FIG. 3 to place outgoing calls according to an embodiment of the invention.

In some embodiments of the invention, the checker 106 performs a technique 270 that is depicted in FIG. 11. In this technique 270, the checker updates the control list and attempts a call, as depicted in blocks 272 and 274. If the checker 106 determines (diamond 276) that the call was answered by a person, then the checker 106 presents (block 278) any messages (if option is selected) records (block 280) a message (if option is selected) and updates (block 282) the contact information (if option is selected). Subsequently, the checker 106 determines (diamond 283) whether a bridge connection is to be performed between the original caller and the member to be contacted.

The determination of whether a bridge connection is to be established may occur in response to a bridge option that is presented to callers. If a bridge connection is to be established, then the checker 106 gets the "best contact number," as indicated in block 284. As discussed above, the "best contact number" may be the contact number set by a member-configured priority list and may alternatively be the last contact number (to the emergency contact system) used by the person to be contacted. Subsequently, the checker 106 connects the parties to form the bridge connection. In some embodiments of the invention, the bridge connection may be made solely by long-distance circuits, thereby avoiding any local telephone exchanges. Lastly, pursuant to the technique 270, the checker 106 updates (block 286) the control list.

Figure 12:
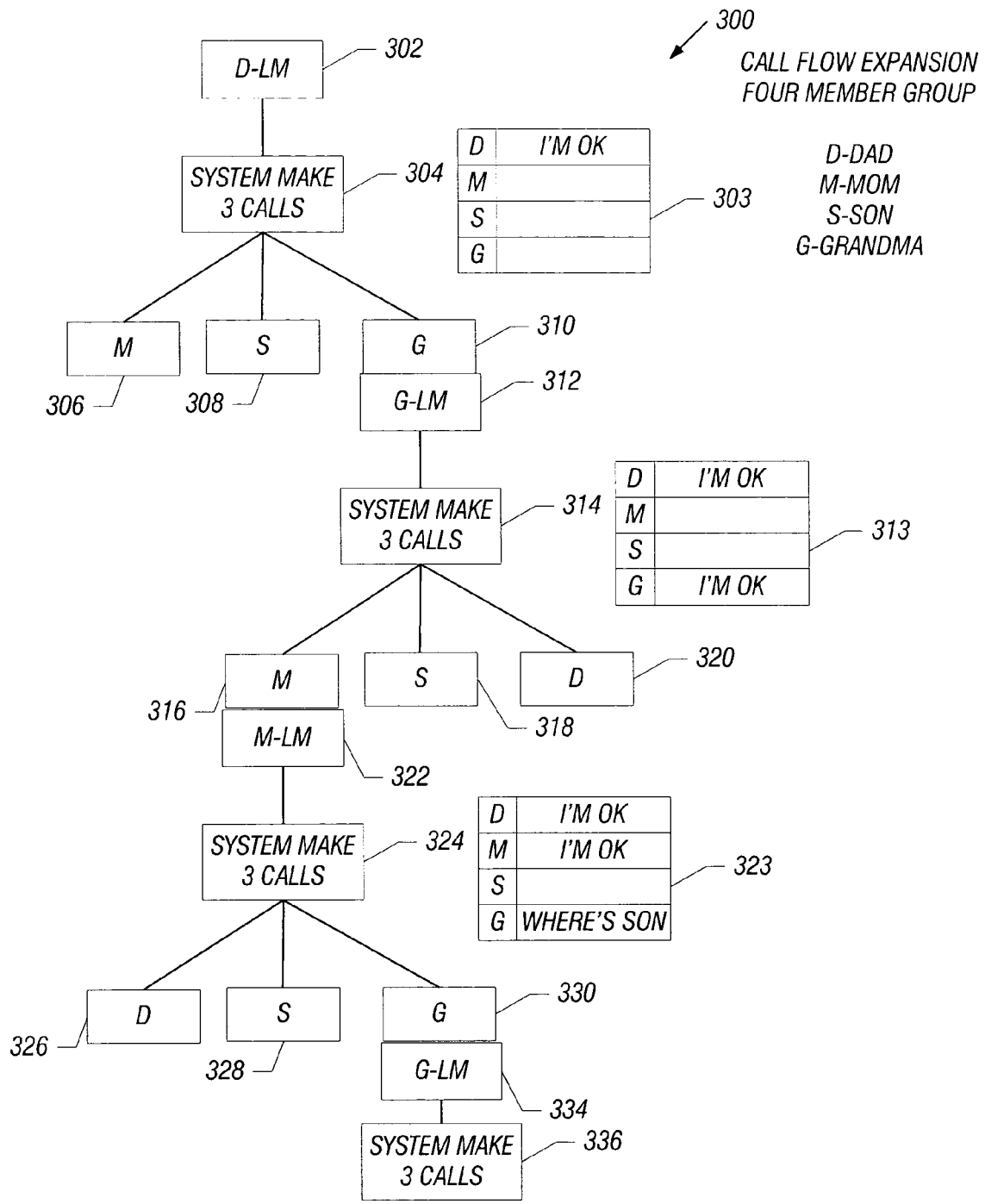
FIG. 12 is an illustration of an exemplary call flow according to an embodiment of the invention.

FIG. 12 generally depicts an exemplary call flow 300 for purposes of illustrating communications that occur through the emergency contact system between family members of a particular group: D ("Dad"), M ("Mom"), S ("Son") and G ("Grandma"). For reasons of simplifying the discussion below, it is assumed that communications between these members and the emergency contact system are telephone calls. However, it is understood other types of communications may occur.

In the exemplary call flow 300, the Dad contacts the emergency number to record a message (as depicted in block 302) for the other family members of the group. Block 303 of the call flow 300 depicts the message ("I am OK") that is left by the Dad.

In response to this recorded message, the emergency contact system makes three telephone calls to the other members of the group, as depicted in block 304. Thus, the emergency contact system makes a call (block 306) to Mom, a call (block 308) a call to the Son, and a call (block 310) to Grandma. Block 303 of the call flow 300 depicts the message ("I am OK") that is left by the Dad.

The Grandma responds to the call to her by recording a message (reflected in block 313) on the emergency contact system, as depicted in block 312. In response to this recorded message, the emergency contact system makes three calls, as depicted in block 314. In this manner, the system calls the other members of the group, i.e., Mom, the Son and the Dad, to relay the message ("I am OK") by the Grandma. Thus, the system places telephone calls to the Mom (block 316), to the Son (block 318) and to the Dad (block 320).

The Mom responds to the latest message by recording (block 322) a message ("I'm OK," as depicted in message block 322). In response to the recorded message from the Mom, the emergency contact system makes three additional telephone calls, as depicted in block 324. These additional calls occur to the Dad (block 326) to the Son (block 328) and to the Grandma (block 330). By this point, the Grandma realizes she has not heard from the Son and records a message on the emergency contact system, as depicted in block 334. This message ("Where's Son?"), as depicted in block 323, prompts the emergency contact system to make three additional calls to the family members, as depicted in block 336.

Thus, as can be seen from this example, emergency contact system automatically contacts the family members when one of the members leaves a message, and the family members may record a message for the other family members in response to a call from the emergency contact system. As can be appreciated from the exemplary call flow 300, only one telephone call was placed by one family member (the Dad in this example), and through the response of the emergency contact system, the family members were able to communicate with each other without placing another telephone call and without requiring knowledge of the telephone numbers of the members of the family.

The call flow 300 is an example only, and many other call flows are possible. For example, the call flow may include a member posting new contact information when the emergency contact system contacts the member. The call flow may also include multiple attempts to contact a particular member as well as communications to multiple contact addresses for a particular member. Thus, many other variations are possible and are within the scope of the appended claims.

Thus, as described herein, a technique in accordance with the invention includes receiving subscriptions from members affiliated with a group and providing a service to automatically attempt communication with at least one member of the group in response to another member of the group contacting the service.

In some embodiments of the invention, the technique further includes providing access cards that, as their names imply, store information that facilitate access to the emergency contact system. As an example, each access card may be a wallet-size smart card or a magnetic stripe card. The access card may store information indicating a prepaid subscription time for access to the emergency contact system. Thus, the access card may be used similar to a telephone calling card, in that a purchaser of the card may enter an access card (printed on the card) or insert the card into a card reader for purposes of establishing a telephone connection with the emergency contact system. In some embodiments of the invention, the access card may electrically or magnetically store subscription information that identifies the user of the card, the group affiliation of this user, contact numbers for members of the group, etc. Furthermore, in some embodiments of the invention, the access card may contain printed information that identifies contact information for the members of the group. Therefore, if the service is not currently available, the group member may use their respective cards to find contact information for purposes of directly contacting members of the group.

While the present invention has been described with respect to a limited number of embodiments, those skilled in the art, having the benefit of this disclosure, will appreciate numerous modifications and variations therefrom. It is intended that the appended claims cover all such modifications and variations as fall within the true spirit and scope of this present invention.

What is claimed is:

1. A method comprising:
 receiving a first communication from a first member of a first group of members of a plurality of groups over a long distance interexchange of a telecommunication system;
 storing contact information for the first group of members prior to receiving the first communication from the first member; and
 providing a processor-based system to, in response to the first communication, associate the first member with the first group of members based on an identifier provided in the first communication, use the stored contact information to automatically attempt to initiate communication with at least one member of the first group other than the first member over the long distance interexchange to deliver a recorded voice message delivered during the first communication, and provide a call history accessible by the first member to indicate which member or members of the first group of members were successfully contacted to deliver the recorded voice message,
 wherein the processor-based system is adapted to retrieve a message number to identify a sound file associated with the recorded voice message and deliver the recorded voice message in a process that includes retrieving the sound file based on the message number.

2. The method of claim 1, wherein the receiving the first communication from the first member comprises receiving a telephone call.

3. The method of claim 1, wherein the automatically attempting to communicate comprising:
 communicating an email with said at least one member of the group other than the first member.

4. The method of claim 1, wherein the automatically attempt to communicate comprises:
 communicating to a telephone number associated with said at least one member of the group other than the first member.

5. The method of claim 1, wherein the processor-based system is adapted to communicate a message to the first member containing the call history.

6. The method of claim 5, wherein the message containing the call history comprises an email message.

7. A system comprising:
 a processor; and a memory storing a program to cause the processor to receive a first communication from a first member of a first group of members over a long distance interexchange of a telecommunication system and in response to the first communication from the first member, associate the first member with the first group of members based on an identifier provided in the first communication, attempt to communicate with at least one member of the group other than the first member over the long distance interexchange to deliver a recorded voice message furnished during the first communication, provide a call history accessible by the first member to indicate which member or members of the first group of members were successfully contacted to deliver the recorded voice message, retrieve a message number to identify a sound file associated with the recorded voice message, and deliver the recorded voice message in a process that includes retrieving the sound file based on the message number.

8. The system of claim 7, wherein the communication from the first member comprises a telephone call.

9. The system of claim 7, wherein the processor communicates an email to said at least one member of the group other than the first member in response to the voice message.

10. The system of claim 7, wherein the processor contact a telephone number associated with said at least one member of the group other than the first member in response to the voice mail message.

11. The system of claim 7, wherein the memory stores contact information from said at least one member of the group other than the first member.

12. The system of claim 7, wherein the processor is adapted to communicate a message to the first member containing the call history.

13. The system of claim 12, wherein the message containing the call history comprises an email message.

14. A non-transitory tangible storage medium readable by a processor-based system and for storing instructions to cause the processor-based system to:

receive a first communication from a first member of a first group of members over a long distance interexchange of a telecommunication system, and in response to the first communication from the first member, associate the first member with the first group of members based on an identifier provided in the first communication, attempt to communicate with at least one member of the group other than the first member over the long distance interexchange to deliver a recorded voice message furnished during the first communication, provide a call history accessible by the first member to indicate which member or members of the first group of members were successfully contacted to deliver the recorded voice message, retrieve a message number to identify a sound file associated with the recorded voice message, and deliver the recorded voice message in a process that includes retrieving the sound file based on the message number.

15. The non-transitory tangible storage medium of claim 14, wherein the first communication comprises a telephone call.

16. The non-transitory tangible storage medium of claim 14, wherein the storage medium storing instructions to cause the processor to communicate an email with said at least one member of the group other than the first member to respond to the voice message.

17. The non-transitory tangible storage medium claim 14, wherein the storage medium storing instructions to cause the processor to contact a telephone number associated with said at least one member of the group other than the first member in response to the voice message.

18. The non-transitory tangible storage medium of claim 14, wherein the storage medium storing instructions to cause the processor-based system to communicate a message to the first member containing the call history.

19. The non-transitory tangible storage medium of claim 18, wherein the message containing the call history comprises an email message.

* * * * *